(12) United States Patent
Thetford et al.

(10) Patent No.: US 8,703,850 B2
(45) Date of Patent: Apr. 22, 2014

(54) DISPERSANT COMPOSITION

(75) Inventors: Dean Thetford, Norden (GB); Patrick J. Sunderland, Rossendale (GB)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 310 days.

(21) Appl. No.: 13/254,037

(22) PCT Filed: Feb. 23, 2010

(86) PCT No.: PCT/US2010/025042
§ 371 (c)(1),
(2), (4) Date: Aug. 31, 2011

(87) PCT Pub. No.: WO2010/101737
PCT Pub. Date: Sep. 10, 2010

(65) Prior Publication Data
US 2011/0319538 A1 Dec. 29, 2011

Related U.S. Application Data

(60) Provisional application No. 61/157,397, filed on Mar. 4, 2009.

(51) Int. Cl.
*C08K 5/52* (2006.01)

(52) U.S. Cl.
USPC .......................................................... 524/115

(58) Field of Classification Search
USPC .......................................................... 524/145
See application file for complete search history.

(56) References Cited

U.S. PATENT DOCUMENTS 4,720,514 A * 1/1988 Needham ...................... 523/351

FOREIGN PATENT DOCUMENTS

| WO | 2005085261 A1 | 9/2005 |
| WO | 2006105322 A2 | 10/2006 |
| WO | 2008116932 A1 | 10/2008 |

* cited by examiner

*Primary Examiner* — Doris Lee
(74) *Attorney, Agent, or Firm* — Michael F. Esposito, Esq.; David M. Shold, Esq.

(57) ABSTRACT

The invention relates to a composition containing a particulate solid, an organic or aqueous medium, and a compound with a head group derived from phosphoric acid. The invention further relates to novel compounds, and the use of the compound as a dispersant.

19 Claims, No Drawings

DISPERSANT COMPOSITION

CROSS REFERENCE TO RELATED APPLICATION

This application claims priority from PCT Application Serial No. PCT/US2010/025042 filed on Feb. 23, 2010, which claims the benefit of U.S. Provisional Application No. 61/157,397 filed on Mar. 4, 2009.

FIELD OF INVENTION

The invention relates to a composition containing a particulate solid, an organic or aqueous medium, and a compound with a head group derived from a phosphoric acid. The invention further relates to novel compounds, and the use of the compound as a dispersant.

BACKGROUND OF THE INVENTION

In Sheet Moulding Composite (SMC) applications, a dispersion or paste is made whereby filler, typically calcium carbonate or alumina trihydrate (ATH) is mixed into a polyester resin. This paste is poured, spread or sprayed onto a carrier film on a conveyor belt, whereupon chopped glass fibres are added. These fibres will provide reinforcement in the final composite. Magnesium oxide powder or paste is added to the mixture, along with peroxides and other additives, followed by a second carrier film and the resulting mixture is pressed through rollers to incorporate the added ingredients. The function of the magnesium oxide is to build a network within the composite, thus increasing the viscosity significantly and rapidly, to a point where the whole mixture is semi-solid. The sheet composite thus formed can then be rolled into a roll (like a rolled rug or carpet) and stored and transported under refrigerated conditions. The end-user of the SMC thus formed may cut sections from the roll to a requisite size, place the piece in a pair of moulds and by the heating and pressure imparted by the mould, the sheet is pressed to the shape of the matched pair of moulds and the composite cross-links to form a rigid fused part or article.

Upon addition of magnesium oxide, the thickening mechanism happens quickly and to a high extent (say from 8000 millipoise to 500,000 millipoise over a few days), so that the time interval between SMC formation and rolling and storage of the sheet is minimized. Acidic dispersing agents, although providing a good reduction of viscosity and good wetting ability when the initial filled paste is formed, can have a deleterious effect upon the subsequent MgO-initiated thickening or maturation stage if they are too strongly acidic. It is believed that a highly acidic dispersing agent anchors to the surface of the magnesium oxide particles, thus preventing the particles forming bonds with the less acidic groups in the unsaturated polyester. It can thus be seen that a dispersing, agent with an optimized level of acidity will present a distinct advantage over a more strongly acidic dispersing agent.

A similar process and advantage of such optimized-acidity dispersing agents may be observed in Bulk Moulding Composites (BMC) where the refrigerated and stored material is in the form of a bulk material such as a ball or block of dough, rather than as a sheet or roll.

There are numerous publications in the patent literature which disclose polyester amine dispersants derived from a poly($C_{2-4}$-alkylene imine) such as polyethyleneimine to which is attached a polyester chain. The polyester chain may be derived from 12-hydroxy stearic acid as disclosed in U.S. Pat. No. 4,224,212 or it may be derived from two or more different hydroxy carboxylic acids or lactones thereof as disclosed in U.S. Pat. Nos. 5,700,395 and 6,197,877. These dispersants are effective on inorganic pigments and fillers in general industrial coatings especially coil coating paint formulations. However, they tend to yellow the final paint coating and degrade the gloss/haze values of the final coating. Polyester phosphate dispersants containing similar polyester chains, as disclosed in U.S. Pat. No. 5,300,255, which are attached to phosphate groups tend not to yellow final paint coatings but gloss and haze values of the paint film can be degraded due to the incompatibility of the polyester chains to the paint formulation. Other disadvantages of the polyester amine and polyester phosphate dispersants are that they can suffer from seeding or crystallization in various polar solvents at room temperature. Consequently, acidic dispersants are sought which can disperse an inorganic pigment or filler in an organic medium such as a polar organic liquid and which do not suffer the disadvantages mentioned above.

Dispersants containing terminal acidic groups such as phosphates are known and are generally prepared by reaction of a hydroxy ended polymer chain with phosphorus pentoxide, phosphorus oxychloride, phosphorus trichloride and pentachloride or polyphosphoric acid. The polymer chains are usually polyester or polyalkoxylate chains containing terminal hydroxyl groups.

U.S. Pat. Nos. 5,151,218 and 5,130,463 disclose a dispersant phosphoric acid ester and salts thereof, wherein the ester group is an aliphatic, cycloaliphatic and/or aromatic moiety having no Zerewitinoff hydrogen, containing at least one ether oxygen atom (—O—) and at least one carboxylic acid ester group (—COO—) and/or urethane group (—NCOO—). The dispersant may be used in a number of coating or thermosetting composite applications. U.S. Pat. No. 5,130,463 also discloses dispersants containing a polyether/polyester derived from ε-caprolactone reacted with polyphosphoric acid. The dispersants are useful in a polar medium, such as ketones and esters. U.S. Pat. No. 6,562,897 discloses dispersants containing a polyether/polyester derived from ε-caprolactone and δ-valerolactone reacted with polyphosphoric acid. The dispersants of all three patents are useful in a polar medium, such as ketones and esters.

U.S. Pat. Nos. 5,464,895 and 5,412,139 both disclose polyaryl organophosphate dispersing agents suitable for thermosetting compositions.

U.S. Pat. No. 6,051,627 discloses dispersants including a polyether derived from ethylene oxide and propylene oxide reacted with polyphosphoric acid. The dispersants are useful in a polar medium such as ketones, esters and water.

U.S. Pat. Nos. 2,213,477; 2,454,542; 3,004,056; 3,004,057, 3,010,903, 3,033,889, 3,099,676, 3,235,627; 4,456,485; 4,720,514; 4,872,916; and 5,914,072 all disclose polyalkoxylates containing terminal hydroxyl groups that have been reacted with various phosphorylating agents.

U.S. Pat. No. 3,462,520 discloses the preparation of phosphate esters of linear C8-20 chain polyalkoxylates. References therein disclose the preparation of phosphate esters of ethoxylates of alkylated phenols, ethoxylates of branch chain aliphatic alcohols and ethoxylates of linear primary alcohols of from C10-15 atoms. All of these compositions are used as emulsifiers, wetting agents dispersing agents, detergents and the like in aqueous applications.

U.S. Pat. No. 5,160,725 discloses the preparation of methoxypolyethyleneglycol phosphates and their use as dispersants of magnetic particles such as iron oxide in aqueous solutions.

U.S. Pat. No. 6,500,917 discloses the preparation of methoxypolyethyleneglycol phosphates from the corresponding diaryl or diaralkyl phosphate ester.

SUMMARY OF THE INVENTION

The inventors of the present invention have discovered that it would be advantageous to have dispersants that are useful in compositions comprising an organic medium. The organic media may include paints, and plastics (such as a thermoset).

The inventors of the present invention have discovered that it would be advantageous to have a thermoset (including (i) a thermosetting resin, or (ii) a cross-linked or fused thermoset plastic) composition containing a compound capable of providing at least one of the following (i) to utilize the dispersant properties of compounds containing terminal acidic groups, (ii) to provide acceptable dispersancy, (iii) to provide acceptable shear stability, (iv) to provide acceptable storage stability, and (v) to provide acceptable viscosity control (thickening performance).

In one embodiment, the invention provides a compound of Formula (I) (typically a mono-ester) and salts thereof:

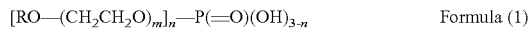
[RO—(CH$_2$CH$_2$O)$_m$]$_n$—P(=O)(OH)$_{3-n}$     Formula (1)

wherein

R may be a C$_{1-6}$ (or C$_{1-4}$) hydrocarbyl or hydrocarbonyl group (typically R may be methyl or ethyl);

m may be 4 to 40, or 4 to 30; and n may be 1 or 2 (typically n may be 1).

In one embodiment, the invention provides a composition comprising a particulate solid, an organic or aqueous medium, and a compound with a head group derived from a compound of Formula (1) and salts thereof. The composition may be a dispersion. The dispersion may be particularly suitable for use in coatings such as paints, and plastics. The plastic may be a thermosetting resin or a cross linked or fused thermoset plastic.

In one embodiment, the invention provides a composition comprising a particulate solid, either (i) a thermosetting resin, or (ii) a cross-linked or fused thermoset plastic; and a compound of Formula (1) (typically a mono-ester) and salts thereof:

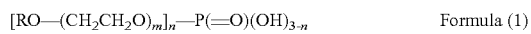
[RO—(CH$_2$CH$_2$O)$_m$]$_n$—P(=O)(OH)$_{3-n}$     Formula (1)

wherein

R may be a C$_{1-6}$ (or C$_{1-4}$) hydrocarbyl or hydrocarbonyl group (typically R may be methyl or ethyl);

m may be 4 to 40, or 4 to 30; and n may be 1 or 2 (typically n may be 1).

The group "RO—(CH$_2$CH$_2$O)$_m$" within [ ]$_n$ may have a number average molecular weight of 350 to 1700, or 350 to 1350, or 350 to 1100.

In one embodiment, the invention provides for the use of the compound disclosed herein to provide either or both of shear stability, or storage stability to a thermosetting resin.

In one embodiment, the invention provides for the use of a compound as a dispersant in a thermosetting composition, wherein the compound is represented by Formula (1) and salts thereof:

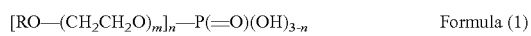
[RO—(CH$_2$CH$_2$O)$_m$]$_n$—P(=O)(OH)$_{3-n}$     Formula (1)

wherein

R is a C$_{1-6}$ hydrocarbyl or hydrocarbonyl group;

m is 4 to 40; and n is 1 or 2.

In one embodiment, the invention provides for the use of a compound as a dispersant in a paint, wherein the compound is represented by Formula (I) and salts thereof:

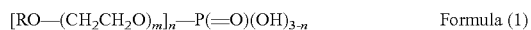
[RO—(CH$_2$CH$_2$O)$_m$]$_n$—P(=O)(OH)$_{3-n}$     Formula (1)

wherein

R is a C$_{1-6}$ hydrocarbyl or hydrocarbonyl group;

m is 4 to 40; and n is 1 or 2.

In one embodiment, the invention provides a composition comprising a particulate solid (typically a pigment or a filler), an organic liquid, a compound with a head group derived from a compound of Formula (1). When the composition of the present invention is a paint, a person skilled in the art will appreciate from common general knowledge that paint compositions also comprise a film-forming resin or resin binder. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermosetting acrylic/melamine-formaldehyde, long oil alkyd, polyether polyols and multi-media resins such as acrylic and urea/aldehyde. This would include resins that cross-link with reactive hardeners at ambient temperatures in so called 2 pack systems, examples being hydroxyl acrylics, polyols, urethanes, and epoxides.

DETAILED DESCRIPTION OF THE INVENTION

In one embodiment, the invention provides for the use of the compound of Formula (1) as a dispersant in the composition disclosed herein.

The present invention provides a composition as disclosed herein above.

R may be methyl, ethyl, propyl, butyl, pentyl, hexyl, acetyl, propionyl, iso-propyl, iso-butyl, or mixtures thereof.

The compound of Formula (1) may be prepared by a process comprising reacting a phosphating agent and a polyalkyleneglycol monoalkyl ether, optionally in the presence of an inert solvent and/or inert atmosphere.

The mole ratio of phosphating agent to the polyalkyleneglycol monoalkyl ether may be 3:1 to 1:3, or 1:1.

The reaction may be carried out at a temperature of 40° C. to 150° C., or 60° C. to 130° C. In order to minimise discoloration of the compound of Formula (1), the temperature may be less than 125° C.

The phosphating agent may include POCl$_3$, P$_2$O$_5$, P$_4$O$_{10}$, polyphosphoric acid, or mixtures thereof.

The polyalkyleneglycol monoalkyl ether may include polyethyleneglycol monomethyl ether, polyethyleneglycol monoethyl ether, polyethyleneglycol monopropyl ether, or mixtures thereof.

Examples of suitable inert solvent include aliphatic hydrocarbons such as octane, petroleum ethers, ligroin, mineral spirits and kerosene; aromatic hydrocarbons such as benzene, toluene and xylene; halogenated aliphatic hydrocarbons such as trichloroethane, tetrachloroethane and aromatic chlorinated hydrocarbons such as di- and tri-chlorobenzene. In one embodiment, the compound, of Formula (1) may be prepared in the absence of inert solvent.

Typically, the reaction may be carried out in an inert atmosphere. The inert atmosphere may be provided by any one of the inert gases of the Periodic Table. In one embodiment, the inert gas may be nitrogen.

Industrial Application

In one embodiment, the compound of Formula (1) may be a dispersant.

The compound of Formula (1) in different embodiments may be present in the composition of the invention in a range selected from 0.1 to 50 wt. %, or 0.25 to 35 wt. %, and 0.5 to 30 wt. %.

The particulate solid present in the composition may be any inorganic solid material which is substantially insoluble in an organic medium at the temperature concerned and which it is desired to stabilize in a finely divided form therein. The particulate solids may be in the form of a granular material, a fibre, a platelet or in the form of a powder, often a blown powder. In one embodiment, the particulate solid may be a pigment.

Examples of suitable solids include pigments, extenders, fillers, blowing agents and flame retardants for paints and plastics materials; solids for oil-based and inverse-emulsion drilling muds; dirt and solid particles in dry cleaning fluids; metals; particulate ceramic materials and magnetic materials for ceramics, piezoceramic printing, abrasives, capacitors, fuel cells, ferrofluids, conductive inks, magnetic recording media, water treatment and hydrocarbon soil remediation; inorganic nanodisperse solids; fibres such as wood, paper, glass, steel, carbon and boron for composite materials; and biocides, agrochemicals and pharmaceuticals which are applied as dispersions in organic media. In one embodiment, the particulate solid may be a pigment or a filler.

In one embodiment, the solid may be an organic pigment. Examples of organic pigments include azo lakes, metal complex pigments, and also lakes of acid, basic and mordant dyes, and carbon black, which although strictly inorganic, behaves more like an organic pigment in its dispersing properties.

Examples of inorganic pigments include metallic oxides such as titanium dioxide, ruffle titanium dioxide and surface coated titanium dioxide, titanium oxides of different colours such as yellow and black, iron oxides of different colours such as yellow, red, brown and black, zinc oxide, zirconium oxides, aluminium oxide, oxymetallic compounds such as bismuth vanadate, cobalt aluminate, cobalt stannate, cobalt zincate, zinc chromate, and mixed metal oxides of two or more of manganese, nickel, titanium, chromium, antimony, magnesium, cobalt, iron or aluminium, Prussian blue, vermillion, ultramarine, zinc phosphate, zinc sulphide, molybdates and chromates of calcium and zinc, metal effect pigments such as aluminium flake, copper, and copper/zinc alloy, pearlescent flake such as lead carbonate and bismuth oxychloride.

Inorganic solids include extenders and fillers such as ground and precipitated calcium carbonate, calcium sulphate, calcium oxide, calcium oxalate, calcium phosphate, calcium phosphonate, barium sulphate, barium carbonate, magnesium oxide, magnesium hydroxide, natural magnesium hydroxide or brucite, precipitated magnesium hydroxide, magnesium carbonate, dolomite, aluminium trihydroxide, aluminium hydroperoxide or boehmite, calcium and magnesium silicates, aluminosilicates including nanoclays, kaolin, montmorillonites including bentonites, hectorites and saponites, mica, talc including muscovites, phlogopites, lepidolites and chlorites, chalk, synthetic and precipitated silica, fumed silica, metal fibres and powders, zinc, aluminium, glass fibres, refractory fibres, carbon black including single- and multi-walled carbon nanotubes, reinforcing and non-reinforcing carbon black, graphite, Buckminsterfullerenes, diamond, alumina, quartz, silica gel, wood flour, powdered paper/fibre, cellulosic fibres such as hemp, sisal, flax, cotton, jute, rice husk, coconut fibre, banana leaf, henequen leaf, abaca, straw and the like, vermiculite, zeolites, hydrotalcites, fly ash from power plants, icinerated sewage sludge ash, pozzolanes, blast furnace slag, asbestos, chrysotile, anthophylite, crocidolite, wollastonite, attapulgite and the like particulate ceramic materials such as alumina, zirconia, titania, silicon nitride, aluminium nitride, boron nitride, silicon carbide, boron carbide mixed silicon-aluminium nitrides and metal titanates; particulate magnetic materials such as the magnetic oxides of transition metals, often iron and chromium, e.g., gamma-$Fe_2O_3$, $Fe_3O_4$, and cobalt-doped iron oxides, ferrites, e.g., barium ferrites; and metal particles, for instance metallic aluminium, iron, nickel, cobalt, copper, silver, gold, palladium, and platinum and alloys thereof.

The organic medium present in the composition of the invention in one embodiment may be a plastic material and in another embodiment an organic liquid. The organic liquid may be a non-polar or a polar organic liquid. By the term "polar" in relation to the organic liquid, it is meant that an organic liquid is capable of forming moderate to strong bonds as described in the article entitled "A Three Dimensional Approach to Solubility" by Crowley et al. in Journal of Paint Technology, Vol. 38, 1966, at page 269. Such organic liquids generally have a hydrogen bonding number of 5 or more as defined in the abovementioned article.

Examples of suitable polar organic liquids include amines, ethers, especially lower alkyl ethers, organic acids, esters, ketones, glycols, glycol ethers, glycol esters, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

In one embodiment, polar organic liquids include dialkyl ketones, alkyl esters of alkane carboxylic acids and alkanols, especially such liquids containing up to, and including, a total of 6 carbon atoms. As examples of the polar organic liquids include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol (also known as 2-methylpropan-1-ol), terpineol and dialkyl and cyclic ethers such as diethyl ether and tetrahydrofuran. In one embodiment, solvents include alkanols, alkane carboxylic acids and esters of alkane carboxlic acids. In one embodiment, the present invention may be suitable for organic liquids that may be substantially non-soluble in an aqueous medium. Furthermore, a person skilled in the art will appreciate that small quantities of a polar medium (such as glycols, glycol ethers, glycol esters and alcohols) may be present in the organic liquids provided the overall organic liquid is substantially non-soluble in an aqueous medium.

The organic liquid may be a polyol, i.e, an organic liquid with two or more hydroxy groups. In one embodiment, polyols include alpha-omega dials or alpha-omega diol ethoxylates.

In one embodiment, non-polar organic liquids include compounds containing aliphatic groups, aromatic groups or mixtures thereof. The non-polar organic liquids include non-halogenated aromatic hydrocarbons (e.g., toluene and xylene), halogenated aromatic hydrocarbons (e.g., chlorobenzene, dichlorobenzene, chlorotoluene), non-halogenated aliphatic hydrocarbons (e.g., linear and branched aliphatic hydrocarbons containing six or more carbon atoms both fully and partially saturated), halogenated aliphatic hydrocarbons (e.g., dichloromethane, carbon tetrachloride, chloroform, trichloroethane) and natural non-polar organics (e.g., vegetable oil, sunflower oil, rapeseed oil, linseed oil, terpenes and glycerides).

In one embodiment, the organic liquid comprises at least 0.1% by weight, or 1% by weight or more of a polar organic liquid based on the total organic liquid. The organic liquid optionally further comprises water. In one embodiment, the organic liquid may be free of water.

The thermosetting resin may include resins which undergo a chemical reaction when heated, catalysed, or subject to ultra-violet, laser light, infra-red, cationic, electron beam, or microwave radiation and become relatively infusible. Typical reactions in thermosetting resins include oxidation of unsaturated double bonds, reactions involving epoxy/amine, epoxy/carbonyl, epoxy/hydroxyl, reaction of epoxy with a Lewis acid or Lewis base, polyisocyanate/hydroxy, ammo resin/hydroxy moieties, free radical reactions or polyacrylate, cationic polymerization of epoxy resins and vinyl ether and condensation of silanol. Examples of unsaturated resins include polyester resins made by the reaction of one or more diacids or anhydrides with one or more diols. Such resins are commonly supplied as a mixture with a reactive monomer such as styrene or vinyltoluene and are often referred to as orthophthalic resins and isophthalic resins. Further examples include resins using dicyclopentadiene (DCPD) as a co-reactant in the polyester chain. Further examples also include the reaction products of bisphenol A diglycidyl ether with unsaturated carboxylic acids such as methacrylic acid, subsequently supplied as a solution in styrene, commonly referred to as vinyl ester resins.

Polymers with hydroxy functionality (frequently polyols) are widely used in thermosetting systems to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including monomeric aliphatic diisocyanates, monomeric aromatic diisocyanates and their polymers. Typical aliphatic diisocyanates include hexamethylene diisocyanate, isophorone diisocyanate and hydrogenated diphenylmethane diisocyanate. Typical aromatic isocyanates include toluene diisocyanates and biphenylmethane diisocyanates.

In one embodiment, the thermosetting composite or cross-linked or fused thermoset plastic may be a polyester resin, a polyester resin in styrene, a polyester resin mixture with a polyvinylacetate, or a polyester resin mixture with a polystyrene polymer.

If desired, the composition of the invention may contain other ingredients, for example, dispersants other than the compound of the present invention, antifogging agents, nucleators, blowing agents, flame retardants, process aids, surfactants, plasticisers, heat stabilizers, compatibilisers, UV absorbers, anti-oxidants, fragrances, mould release aids, anti-static agents, anti-microbial agents, biocides, coupling agents, lubricants (external and internal), impact modifiers, slip agents, air release agents and viscosity depressants.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid may be an organic material, such as an organic pigment, in one embodiment contains from 15 to 60% by weight of the solid whereas a composition in which the solid may be an inorganic material, such as an inorganic pigment, filler or extender, in one embodiment contains from 40 to 90% by weight of the solid based on the total weight of composition.

The composition of the invention may be prepared by any of the conventional methods known for preparing dispersions. Thus, the particulate solid, the thermosetting composite or cross-linked or fused thermoset plastic and the compound of Formula (1) may be mixed in any order, the mixture then being subjected to a mechanical treatment to reduce the particles of the solid to an appropriate size, for example by high speed mixing, ball milling, basket milling, bead milling, gravel milling, sand grinding, attritor grinding, two roll or three roll milling, plastic milling until the dispersion is formed. Alternatively, the particulate solid may be treated to reduce its particle size independently or in admixture with (i) either the thermosetting composite or cross-linked or fused thermoset plastic, or (ii) the compound of Formula (1), the other ingredient or ingredients then being added and the mixture being agitated to provide the composition. The composition may also be made by grinding or milling the dry particulate solid with the compound of Formula (1) and then adding the liquid medium. Alternatively, the composition may be made by mixing the solid with the compound of Formula (1) in a liquid medium in a pigment flushing process.

In one embodiment, the composition of the present invention may be suited to liquid dispersions. In one embodiment, such dispersion compositions comprise; (a) 0.5 to 40 parts of a particulate solid, (b) 0.5 to 30 parts of a compound of Formula (1), and (c) 30 to 99 parts of an organic or aqueous medium; wherein all relative parts are by weight and the amounts (a)+(b)+(c)=100.

If a composition is required including a particulate solid and a compound of Formula (1) in dry form, the organic liquid is typically volatile so that it may be readily removed from the particulate solid by a simple separation means such as evaporation. In one embodiment, the composition includes the organic, liquid.

If the dry composition consists essentially of the compound of Formula (1) and the particulate solid, it typically contains at least 0.2%, at least 0.5% or at least 1.0% compound of Formula (1) based on weight of the particulate solid. In one embodiment, the dry composition contains not greater than 100%, not greater than 50%, not greater than 20% or not greater than 10% by weight of compound of Formula (1) based on the weight of the particulate solid.

As disclosed hereinbefore, the compositions of the invention may be suitable for preparing dispersions wherein the particulate solid may be milled in an organic liquid in the presence of a compound for Formula (1) and salts thereof In one embodiment, the invention provides a dispersion comprising a particulate solid, the thermosetting composite or cross-linked or fused thermoset plastic, and a compound of Formula (1) and salts thereof.

Typically, the dispersion contains from 20 to 90% by weight particulate solid based on the total weight of the dispersion. In one embodiment, the particulate solid may be not less than 10 or not less than 20% by weight of the dispersion.

The amount of compound of Formula (1) in the dispersion may be dependent on the amount of particulate solid but is typically from 0.5 to 5% by weight of the dispersion.

Dispersions made from the composition of the invention may be suitable for use in aqueous, non-aqueous and solvent-free formulations in which energy curable systems (ultra-violet, laser light, infra-red, cationic, electron beam, microwave) are employed with monomers, oligomers, etc. or a combination present in the formulation. They are particularly suitable for use in coatings such as paints, and plastics. Suitable examples include their use in low, medium and, high solids paints, general industrial paints including baking, 2 component and metal coating paints (such as coil and can coatings), powder coatings, UV-curable coatings, wood varnishes; polyol and plastisol dispersions; ceramic processes, especially tape-casting, gel-casting, doctor-blade, extrusion and injection moulding type processes, a further example would be in the preparation of dry ceramic powders for isostatic pressing; composites such as sheet moulding and bulk moulding compounds, resin transfer moulding, pultrusion, hand-lay-up and spray-lay-up processes, matched die moulding; construction materials like casting resins, personal care like nail coatings, sunscreens, adhesives, plastics materials and electronic materials such as coating formulations for colour filter systems in displays including OLED devices, liquid crystal displays and electrophoretic displays, glass coatings including optical fibre coatings, reflective coatings or anti-reflective coatings, conductive and magnetic coatings. They may be useful in the surface modification of pigments and fillers to improve the dispersibility of dry powders used in the above applications. Further examples of coating materials are given in Bodo Muller, Ulrich Poth, Lackformulierung und Lackrezeptur, Lehrbueh fr Ausbildung und Praxis, Vincentz Verlag, Hanover (2003) and in P. G. Garrat, Strahlerthartung, Vincentz Verlag, Hanover (1996).

In one embodiment, the composition of the invention further includes one or more additional known dispersants.

The following examples provide illustrations of the invention. These examples are non exhaustive and are not intended to limit the scope of the invention.

EXAMPLES

Comparative Example A (COMPA)

A dispersant similar to the phosphated dispersants disclosed in U.S. Pat. No. 6,562,897, where the polyether-polyester chain was prepared from methoxy polyethyleneglycol molecular weight 350 with caprolactone and valerolactone.

Comparative Example B (COMPB)

A dispersant similar to the phosphated dispersants disclosed in U.S. Pat. No. 6,051,627, Example 19 therein, except prepared from methoxy polyethyleneglycol molecular weight 550 and polypropylene glycol with a number average molecular weight of 175.

Comparative Dispersant C (COMPC) is Example 4 of EP 164 817.

Comparative Dispersant D (COMPD) is Example 12 of U.S. Pat. No. 5,700,395.

Example 1 (EX1)

Polyethyleneglycol monomethyl ether (Mn 350, ex Fluka, 100 parts) and polyphosphoric acid (Ex Fluka, 22.7 parts) are warmed at 70° C. in an oven until pourable, then charged to a 150 ml flask. The mixture is set to stir vigorously under a nitrogen atmosphere, then the flask immersed in an oil bath heated to 120° C. Stirring is continued at this temperature for 6 hours, giving a yellow, viscous liquid.

Example 2 (EX2)

Polyethyleneglycol monomethyl ether (Mn 550, ex Fluka, 100 parts) and polyphosphoric acid (Ex Fluka, 14.5 parts) are warmed at 70° C. in an oven until pourable, then charged to a 150 ml flask. The mixture is set to stir vigorously under a nitrogen atmosphere, then the flask immersed in an oil bath heated to 120° C. Stirring is continued at this temperature for 6 hours, giving a yellow, viscous liquid.

Example 3 (EX3)

Polyethyleneglycol monomethyl ether (Mn 750, ex Fluka, 100 parts) and polyphosphoric acid (Ex Fluka, 10.6 parts) are warmed at 70° C. in an oven until pourable, then charged to a 150 ml flask. The mixture is set to stir vigorously under a nitrogen atmosphere, than the flask immersed in an oil bath heated to 120° C. Stirring is continued at this temperature for 6 hours, giving a yellow, viscous liquid.

Example 4 (EX4)

Polyethyleneglycol monomethyl ether (Mn 1100, ex Fluka, 100 parts) and polyphosphoric acid (Ex Fluka, 7.23 parts) are warmed at 70° C. in an oven until pourable, then charged to a 150 ml flask. The mixture is set to stir vigorously under a nitrogen atmosphere, then the flask immersed in an oil bath heated to 120° C. Stirring is continued at this temperature for 6 hours, giving a white waxy solid.

Dispersion Preparation (DEX1 to DEX4 and DCOMPA to DCOMPB): A series of dispersions are prepared by preparing thermosetting composites based on the compositions shown in the table below (quantities quoted are in parts). Dispersions DEX1 to DEX4 contain the product of EX1 to EX4 respectively. Likewise, DCOMPA and DCOMPB contain the product of COMPA and COMPB respectively. The dispersions prepared are:

| Dispersion Composition | DCOMPA | DCOMPB | DEX1 | DEX2 | DEX3 | DEX4 |
|---|---|---|---|---|---|---|
| Palapreg ™ H | 25.0 | 25.0 | 25.0 | 25.0 | 25.0 | 25.0 |
| Palapreg ™ P | 25.0 | 25.0 | 25.0 | 25.0 | 25.0 | 25.0 |
| Millicarb ™ OG | 105.0 | 105.0 | 105.0 | 105.0 | 105.0 | 105.0 |
| Luvatol ™ MK25 | 0.25 | 0.25 | 0.25 | 0.25 | 0.25 | 0.25 |
| Dispersant | 1.1 | 1.1 | 1.1 | 1.1 | 1.1 | 1.1 |

Footnote:

A-Palapreg ™ H is Palapreg ™ H880-01 is a modified polyvinyl acetate low profile additive, supplied by DSM Resins.

B-Palapreg ™ P is Palapreg ™ P 18-03 is an unsaturated polyester resin in styrene, supplied by DSM resins.

C-Millicarb ™ OG is a limestone-derived calcium carbonate filler with a median particle size of 2.7 microns, supplied by Omya.

D-Luvatol ™ MK 25 is a magnesium oxide thickening agent supplied by Lehmann and Voss.

Dispersion Preparation: Dispersions described above are prepared by the following procedure. The two Palapreg™ resins are weighed into a stainless steel jacketed milling vessel. Each test example is added to the resin mixture and the three components were mixed at 1500 rpm on a Dispermat™ F1 high shear mixer for 30 seconds. Mixing speed is increased to 3000 rpm and the Millicarb™ OG is added over the course of 1 minute. Mixing is continued for a further 15 minutes at 3000 rpm, then the mixer stopped. A small sample of the resulting dispersion is removed for initial viscosity measurement. Luvatol™ MK25 is added to the milling vessel and mixing restarted at 2000 rpm for 2 minutes. The mixer is stopped and the dispersion transferred to a storage container. The viscosity of the stored dispersion is measured after 15 minutes, 1 hour, 1 day, 2 days and 5 days.

Each paste sample is measured on a TA Instruments™ AR500 Controlled Stress rheometer in flow measurement mode, using a 40 mm cross-hatched stainless steel plate. Measurements, are made at 25° C. The samples are sheared at rates of $0.1\ s^{-1}$ to $126.5\ s^{-1}$. The viscosity data (Pa s) obtained is as follows:

| | Shear Rate ($s^{-1}$) | | | | | | |
|---|---|---|---|---|---|---|---|
| | 0.156 | 0.6930 | 1.746 | 4.326 | 10.29 | 25.55 | 51.09 |
| DCOMPA | 434.8 | 182.5 | 118.8 | 90.13 | 80.42 | 77.57 | 75.39 |
| DCOMPB | 498.6 | 195.2 | 138.6 | 88.6 | 67.8 | 63.1 | 59.8 |
| DEX1 | 430.6 | 176.0 | 109.3 | 79.86 | 66.02 | 60.37 | 58.13 |
| DEX2 | 329.9 | 151.4 | 95.62 | 69.23 | 58.07 | 54.43 | 52.64 |
| DEX3 | 276.5 | 130.0 | 84.31 | 62.34 | 53.10 | 49.94 | 48.95 |
| DEX4 | 245.3 | 120.7 | 79.91 | 60.65 | 51.41 | 49.13 | 48.67 |

The samples of the invention typically have a lower viscosity than DCOMPA and DECOMPB. This indicates that the processing is easier, or allows for higher filler loading.

Storage viscosity, following the addition of the magnesium oxide thickener is measured on a Brookfield RV viscometer using a number 7 spindle and a speed of 5 rpm. Typically, samples that do not reach a viscosity of 500,000 millipoise fail the test. The viscosity data (mP) obtained is as follows:

| | Units (millipoise) mP × 1000 | | | | |
|---|---|---|---|---|---|
| | 15 minutes | 1 hour | 1 Day | 2 Days | 5 Days |
| DCOMPA | 126 | 157 | 686 | >800 | >800 |
| DCOMPB | 101 | 82 | 152 | 182 | 218 |
| DEX1 | 127 | 163 | 392 | 578 | 580 |
| DEX3 | 87.2 | 110 | 345 | 422 | 610 |
| DEX4 | 83.2 | 100 | 384 | 570 | 740 |

The data obtained from the tests indicates that compositions of the invention have a lower shear than comparable dispersants disclosed, whilst having sufficient thickening.

The dispersants prepared above are formulated into a polyester coil coating paint system. The following white final paint is prepared using the formulation and ingredients listed below.

White Paint Manufacture

The dispersants were formulated into a polyester coil coating paint system. The following white final paint is prepared using the formulation and ingredients listed below.

| Millbase Composition | | | |
|---|---|---|---|
| Generic name | Source | Parts | Wt. % |
| Tipure R960 | Du Pont | 53.00 | 70.0 |
| Dispersant | | 1.61 | 2.1 |
| Modaflow III | Monsanto | 0.61 | 0.8 |
| Dibasic Esters | Aldrich | 6.50 | 8.6 |
| Solvesso 100 | Exxon | 8.57 | 11.3 |
| Uralac SN833 S2-55 | DSM | 5.42 | 7.2 |
| Total | | 75.71 | 100 |

| Coating Letdown Components | | | |
|---|---|---|---|
| Generic name | Function | Source | Parts |
| Millbase | Colorant | | 7.14 |
| Uralac SN833 S2-55 | Polyester resin | DSM | 6.60 |
| Resimene 747 | MF Crosslinker Resin | Cytec | 1.07 |
| Dibasic Esters (DBE) | Solvent | Aldrich | 1.32 |
| Dowanol PMA | Solvent | Dow | 1.72 |
| TOTAL PAINT weight | | | 17.85 |
| Final pigment % | | | 30 |

Solvesso 100 and DBE is added to a 125 g glass jar. The dispersant is then added along with the Uralac polyester resin and Modaflow III. 120 g of 3 mm glass beads is then added followed by the Tipure R960 pigment. The jar is sealed and the mixture milled on a Skandex lau for 90 minutes. The white paint is sieved through a 400 micron mesh to remove the glass beads and allowed to cool to room temperature. The millbase viscosities are measured on a Bohlin V88 viscometer at 20° C. (units of Pa s). Additional amount of Solvesso 100 (5 parts) is added to the millbase. Then, a final paint is prepared by thoroughly mixing the materials disclosed in the letdown section of the table above. The final paint is coated on Leneta black and white drawdown metal panels using an automatic K-coater (Sheen) and no 6 K-Bar (Sheen) to give a film thickness of 60μ. The coating patterns are cured at 230° C. for 45 seconds and then allowed to cool.

Drawdown Testing

Gloss and haze measurements were measured using a Byk-Gardner Gloss and Haze meter after the curing period. Colouristic values and Berger Whiteness were measured on the Macbeth Colour Eye. The results obtained are:

TABLE

| Viscosities of Millbases at Various Shear Rates | | | | | | | | |
|---|---|---|---|---|---|---|---|---|
| Shear Rate $s^{-1}$ | 37.6 | 102.0 | 176.0 | 296.8 | 491.2 | 837.0 | 1408.0 | 2392 |
| COMPB | 2.417 | 1.379 | 1.065 | 0.869 | 0.711 | 0.595 | 0.516 | 0.406 |
| COMPC | 4.085 | 3.774 | 2.249 | 1.731 | 1.303 | 0.853 | 0.477 | 0.253 |
| COMPD | — | 0.167 | 0.146 | 0.135 | 0.113 | 0.097 | 0.089 | 0.087 |

TABLE-continued

Viscosities of Millbases at Various Shear Rates

| Shear Rate s⁻¹ | 37.6 | 102.0 | 176.0 | 296.8 | 491.2 | 837.0 | 1408.0 | 2392 |
|---|---|---|---|---|---|---|---|---|
| EX1 | 2.987 | 1.484 | 1.102 | 0.898 | 0.741 | 0.664 | 0.626 | 0.646 |
| EX2 | 2.628 | 1.329 | 0.997 | 0.826 | 0.708 | 0.623 | 0.597 | 0.171 |

TABLE

Coating Properties

| Dispersant | 60' Gloss | 20' Gloss | Haze | Berger Whiteness |
|---|---|---|---|---|
| COMPB | 89.7 | 56.3 | 193 | 91.73 |
| COMPC | 67.8 | 29.6 | 413 | 88.59 |
| COMPD | 85.6 | 59.5 | 240 | 75.72 |
| EX1 | 93.6 | 68.0 | 181 | 90.24 |
| EX2 | 101.0 | 87.3 | 94.2 | 92.74 |

The desire is to have low viscosity millbases to make high gloss, low haze paints with high whiteness value and opacity. This indicates excellent dispersion and good compatibility with the organic medium. It is apparent that the dispersants used in accordance with the present invention as compared with the non-inventive, comparable dispersant example B of the prior art, exhibit higher gloss, lower haze and equivalent whiteness value and viscosity. When compared with the non-inventive, comparable dispersant C of the prior art, the dispersants of the present invention exhibit lower viscosity, higher gloss, lower haze and higher whiteness and opacity results. When compared with the non-inventive, comparable dispersant example D of the prior art, the dispersants of the present invention exhibit higher gloss, lower haze, much higher whiteness values and higher opacity.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition comprising a particulate solid, an organic or aqueous medium, and a compound with a head group derived from a compound of Formula (1) and salts thereof:

$$[RO-(CH_2CH_2O)_m]_n-P(=O)(OH)_{3-n}$$ Formula (1)

wherein
R is methyl or ethyl;
m is from 4 to 40; and
n is 1 or 2.

2. The composition of claim 1, wherein the group RO—$(CH_2CH_2O)_m$ within [ ]$_n$ has a number average molecular weight of 350 to 1100.

3. The composition of claim 1, wherein the particulate solid is a pigment or filler.

4. The composition of claim 1, wherein the group RO—$(CH_2CH_2O)_m$ within [ ] has a number average molecular weight of 350 to 1700.

5. The composition of claim 4, wherein the compound is present at 0.25 to 35 wt %.

6. The composition of claim 4, wherein the compound is present at 0.5 to 30 wt % of the composition.

7. The composition of claim 4, wherein the compound of Formula (1) is a mono-ester.

8. The composition of claim 1, wherein the composition is a dispersion.

9. The composition of claim 8, wherein the dispersion is for use in coatings such as paints, and plastics.

10. The composition of claim 9, wherein the plastic is a thermosetting resin or a cross-linked or fused thermoset plastic.

11. The composition of claim 10, wherein the thermosetting composite or the cross-linked or fused thermoset plastic is a polyester resin, a polyester resin in styrene, a polyester resin mixture with a polyvinylacetate, or a polyester resin mixture with a polystyrene polymer.

12. A composition comprising a particulate solid, an organic or aqueous medium, and a compound with a head group derived from a compound of Formula (1) and salts thereof, and, either (i) a thermosetting resin, or (ii) a cross-linked or fused thermoset plastic; wherein the compound of Formula (1) and salts thereof is:

$$[RO-(CH_2CH_2O)_m]_n-P(=O)(OH)_{3-n}$$ Formula (1)

wherein
R is a $C_{1-6}$ hydrocarbyl or hydrocarbonyl group;
m is from 4 to 40; and
n is 1 or 2.

13. The composition of claim 12, wherein the group RO—$(CH_2CH_2O)_m$ within [ ]$_n$ has a number average molecular weight of 350 to 1100.

14. The composition of claim 12, wherein the particulate solid is a pigment or filler.

15. The composition of claim 12, wherein the composition is a dispersion.

16. The composition of claim 12, wherein the group RO—$(CH_2CH_2O)_m$ within [ ]$_n$ has a number average molecular weight of 350 to 1700.

17. The composition of claim 16, wherein the compound is present at 0.25 to 35 wt %.

18. The composition of claim 16, wherein the compound is present at 0.5 to 30 wt % of the composition.

19. The composition of claim 16, wherein the compound of Formula (1) is a mono-ester.

* * * * *